May 29, 1928.  H. D. HUMPHREY  1,671,643

BRAKE

Filed May 3, 1926

INVENTOR
HOMER D. HUMPHREY
BY
ATTORNEY

Patented May 29, 1928.

1,671,643

UNITED STATES PATENT OFFICE.

HOMER D. HUMPHREY, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed May 3, 1926. Serial No. 106,224.

This invention relates to brakes and is illustrated as embodied in an internal expanding automobile brake. An object of the invention is to provide a brake-applying means which can shift to center itself, in combination with a novel stop arranged to prevent undesired shifting which would allow the brake shoes or their equivalent to drag against the drum.

In one desirable arrangement the stop for limiting the shifting of the brake-applying means is arranged on the outside of the backing plate of the brake, where it is readily accessible for adjustment. The particular stop illustrated in the drawing is an eccentric which may be a part of an adjusting lever arranged to be clamped to the backing plate in any desired angular position. Preferably the cam or other brake-applying device is supported by a bracket having parts projecting through relatively large openings in the backing plate to allow the described shifting and permit the use of washers or the like cooperating with the bracket to embrace the backing plate.

The above-described stop may, if desired, be arranged to engage one of these washers.

The above and other objects and features of the invention, including various novel combinations of parts and desirable particular constructions, will be apparent from the following description of one illustrative embodiment shown in the accompanying drawing, in which.

Figure 1:
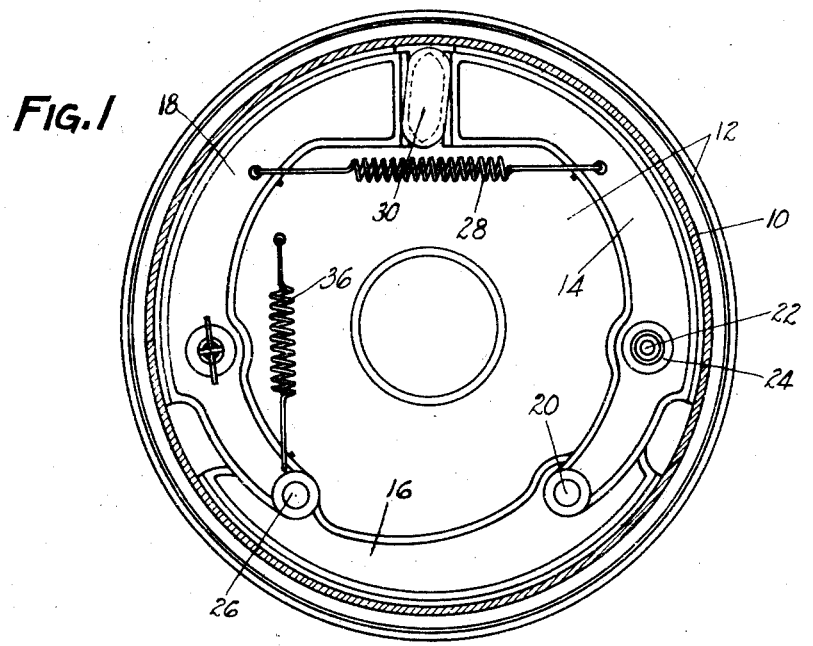
Figure 1 is a vertical section through the brake just inside the head of the drum and showing the shoes in side elevation.
Figure 2:
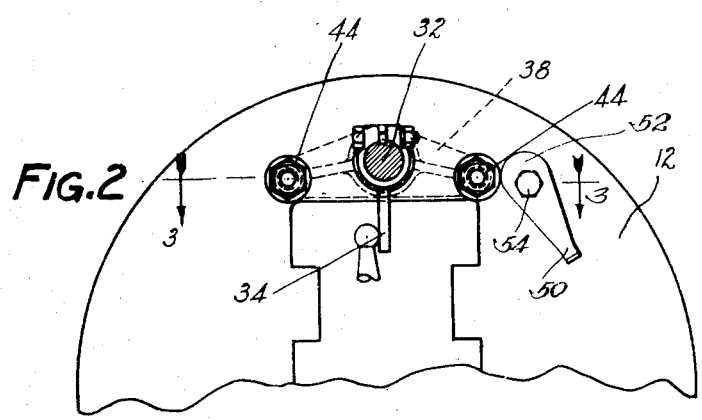
Figure 2 is an inside elevation of the brake looking outwardly toward the backing plate and showing only the upper part of the backing plate.
Figure 3:
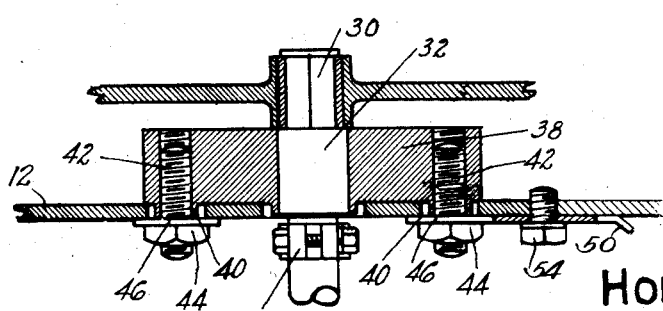
Figure 3 is a section on the line 3—3 of Figure 2 showing the mounting of the bracket and stop.

The particular brake selected for illustration includes a drum 10 and a backing plate or other support 12 arranged at one side of the drum. Between the drum and backing plate is arranged the friction means of the brake, herein shown as a plurality of shoes, 14, 16, and 18. Shoe 14 is anchored on the backing plate 12 by means of a pivot 20 passing through a relatively large opening in the stiffening web of shoe 16, while shoe 16 is anchored on the backing plate 12 by means of a pivot 22 passing through relatively large openings 24 in spaced anchoring arms forming the end of shoe 14. Shoe 18 is connected to shoe 16 by means such as a suitable floating pivot 26. Shoes 14 and 18 are forced apart to apply the brake against the resistance of a return spring 28, by suitable means such as a cam 30 on a shaft 32 operated by a crank arm 34. When the brake is applied shoe 18 moves slightly around the drum to apply shoe 16 against the resistance of an auxiliary return spring 36.

According to an important feature of the present invention, the cam 30 or other brake-applying means is carried by a bracket 38 having bosses 40 projecting through relatively large openings in the backing plate 12 to permit the bracket to shift to center the brake-applying device when the brake is applied. The bracket is shown as carrying a pair of studs 42 on which are threaded nuts 44 clamping against the bosses 40 suitable washers or the like 46 which project beyond the openings in the backing plate and cooperate with the body of the bracket 38 to embrace the backing plate while at the same time permitting the above-described shifting.

If the bracket were free to float without restriction, and since the drum during forward movement of the vehicle,—that is, nearly all the time,—is turning counterclockwise in Figure 1, there is a possibility that the shoes 14 and 18 might shift together to the left, with the cam and bracket, until shoe 18 engaged the drum and set up an undesirable drag against the drum. If the shoes were to shift to the right, the drum would quickly swing the shoes back again because of the fact that any engagement with shoe 14 tends to swing the shoe away from the drum. This is not necessarily true, however, if the shoes were to swing to the left, since the friction of the drum against shoe 18 tends to wedge it more tightly against the drum rather than to swing it away. For this reason I prefer to provide a novel stop to limit the shifting of the bracket 38 in the direction permitting shoe 18 to drag against the drum,—that is, to the left in Figure 1.

In one desirable arrangement the stop is in the form of a lever 50 having an eccentric surface 52 engaged by one of the washers 46. The lever can be turned to any desired angular position to adjust the clearance between shoe 18 and the drum, and is then clamped in adjusted position against the backing plate 12 by means such as a clamp screw 54.

While one desirable embodiment has been described in detail, it is not my intention to limit the scope of the invention to the particular embodiment illustrated or otherwise than by the terms of the appended claims.

I claim:

1. A brake comprising, in combination, a drum, a backing plate, friction means between the drum and backing plate, a brake-applying device having a part projecting outside the backing plate and which is arranged to shift to center itself, and a stop on the outside of the backing plate engaging said part and arranged to limit the shifting.

2. A brake comprising, in combination, a drum, a backing plate, friction means between the drum and backing plate, a brake-applying device having a part projecting outside the backing plate and which is arranged to shift to center itself, and an adjustable stop on the outside of the backing plate engaging said part and arranged to limit the shifting.

3. A brake comprising, in combination, a drum, a backing plate, friction means between the drum and backing plate, a brake-applying device having a part projecting outside the backing plate and which is arranged to shift to center itself, and an eccentric mounted on the outside of the backing plate with its edge arranged to engage said part of the brake-applying device.

4. A brake comprising, in combination, a drum, a backing plate, friction means between the drum and backing plate, a brake-applying device having a part projecting outside the backing plate and which is arranged to shift to center itself, and a lever pivoted on the outside of the backing plate and having an eccentric end arranged to serve as a stop engaging said part of the brake-applying device.

5. A brake comprising, in combination, a drum, a backing plate, friction means between the drum and backing plate, a brake-applying device having a part projecting outside the backing plate and which is arranged to shift to center itself, a lever pivoted on the outside of the backing plate and having an eccentric end arranged to serve as a stop engaging said part of the brake-applying device, and means for clamping the lever to the backing plate in any desired position of angular adjustment.

6. A brake comprising, in combination, a drum, a backing plate at the open side of the drum, a friction device between the drum and the backing plate having adjacent separable ends, a brake-applying device engaging said ends, a bracket carrying the brake-applying device and having parts projecting into relatively large openings in the backing plate to permit the bracket to shift to center the brake-applying device, threaded studs carried by the projecting parts of the bracket, washers engaging the ends of the projecting parts of the bracket and projecting beyond the openings in the backing plate, nuts threaded on said studs and clamping the washers against the bracket to embrace the backing plate between the washers and bracket, and a stop arranged to engage one of the washers to limit the shifting of the bracket.

7. A brake comprising, in combination, a drum, a backing plate at the open side of the drum, a friction device between the drum and the backing plate having adjacent separable ends, a brake-applying device engaging said ends, a bracket carrying the brake-applying device and having parts projecting into relatively large openings in the backing plate to permit the bracket to shift to center the brake-applying device, threaded studs carried by the projecting parts of the bracket, through the backing plate, washers engaging the ends of the projecting parts of the bracket and projecting beyond the openings in the backing plate, and nuts threaded on said studs and clamping the washers against the bracket to embrace the backing plate between the washers and bracket.

In testimony whereof, I have hereunto signed my name.

HOMER D. HUMPHREY.